US008235786B2

(12) United States Patent
Meyer

(10) Patent No.: US 8,235,786 B2
(45) Date of Patent: Aug. 7, 2012

(54) LOTTERY SYSTEM AND METHOD INCORPORATING RANDOM CREDIT ALLOCATION TO A PLURALITY OF GAMES

(75) Inventor: Mark G. Meyer, Cumming, GA (US)

(73) Assignee: Scientific Games International, Inc., Newark, DE (US)

( * ) Notice: Subject to any disclaimer, the term of this patent is extended or adjusted under 35 U.S.C. 154(b) by 223 days.

(21) Appl. No.: 12/821,783

(22) Filed: Jun. 23, 2010

(65) Prior Publication Data

US 2011/0003626 A1 Jan. 6, 2011

Related U.S. Application Data

(60) Provisional application No. 61/219,573, filed on Jun. 23, 2009.

(51) Int. Cl.

| | |
|---|---|
| ***G06F 17/00*** | (2006.01) |
| ***G06F 19/00*** | (2006.01) |
| ***A63F 9/24*** | (2006.01) |
| ***A63F 13/00*** | (2006.01) |

(52) U.S. Cl. ................................ 463/17; 463/25; 463/42

(58) Field of Classification Search .............. 463/16–20, 463/25, 29, 40–42; 273/138.1, 139

See application file for complete search history.

(56) References Cited

U.S. PATENT DOCUMENTS

| | | | | |
|---|---|---|---|---|
| 5,158,293 | A | 10/1992 | Mullins | |
| 6,277,026 | B1 * | 8/2001 | Archer | 463/42 |
| 7,134,959 | B2 | 11/2006 | Penrice | |
| 7,476,152 | B2 * | 1/2009 | Malle et al. | 463/17 |
| 2003/0114211 | A1 | 6/2003 | White | |
| 2003/0148805 | A1 * | 8/2003 | Hughes | 463/17 |
| 2003/0216164 | A1 | 11/2003 | Scrymgeour | |
| 2004/0121834 | A1 * | 6/2004 | Libby et al. | 463/19 |
| 2004/0227000 | A1 | 11/2004 | Behm et al. | |
| 2005/0164770 | A1 * | 7/2005 | Wright | 463/17 |
| 2005/0165619 | A1 * | 7/2005 | Wright | 705/1 |
| 2006/0094492 | A1 | 5/2006 | Wolfe | |
| 2006/0160599 | A1 * | 7/2006 | Tulley et al. | 463/16 |
| 2006/0273156 | A1 | 12/2006 | Behm et al. | |

(Continued)

FOREIGN PATENT DOCUMENTS

CA 2 566 152 A1 5/2003

(Continued)

OTHER PUBLICATIONS

PCT Search Report, October 4, 2010.

*Primary Examiner* — Milap Shah

(74) *Attorney, Agent, or Firm* — Dority & Manning, P.A.

(57) ABSTRACT

A gaming system and associated methodology include means for a player to place a wager to participate in play of a plurality of base games, the wager entitling the player to a block of credits. A central lottery computer system is configured to randomly divide the block of credits between the plurality of base games and to conduct the plurality of base games. Means are provided for the player to interact with the central lottery computer system for simulated play of each of the plurality of base games. A prize is awarded for a winning play of any one of the base games and is a function of the number of credits that were randomly assigned to the respective base game by the central lottery computer system.

21 Claims, 8 Drawing Sheets

U.S. PATENT DOCUMENTS

| | | | | |
|---|---|---|---|---|
| 2006/0281523 | A1 | 12/2006 | Walker et al. | |
| 2008/0085763 | A1 * | 4/2008 | Randhawa | 463/25 |
| 2008/0182646 | A1 * | 7/2008 | Okada | 463/20 |
| 2008/0220856 | A1 * | 9/2008 | Lynch et al. | 463/25 |

FOREIGN PATENT DOCUMENTS

| | | | |
|---|---|---|---|
| EP | 1 574 236 | A | 9/2005 |
| WO | WO 99/26204 | | 5/1999 |
| WO | WO 2006/009791 | | 1/2006 |

* cited by examiner

LOTTERY SYSTEM AND METHOD INCORPORATING RANDOM CREDIT ALLOCATION TO A PLURALITY OF GAMES

PRIORITY CLAIM

The present application claims priority to U.S. Provisional Application Ser. No. 61/219,573, filed Jun. 23, 2009.

BACKGROUND

Lottery games have been previously conducted by providing lottery tickets at retail establishments that provide for either instant outcome determinations or results that are determined by a drawing conducted subsequent to the purchase of the lottery ticket. For example, a player may purchase a ticket at a retail establishment and play the card instantly by scratching off removable material to determine whether a prize has been won. Alternatively, the player may purchase a ticket having a number that is entered into a subsequently conducted drawing. One or more drawings are conducted on subsequent dates to determine winners. Results may be announced, for example, on television or radio.

For the instant ticket example, the game lasts only until the player removes the scratch-off material from the ticket to determine the final outcome. As such, the player has limited interaction in a game experience that is relatively short. For the ticket used in a subsequent drawing, the player must wait until the drawing is conducted to determine the only and final outcome and must learn such results by receiving the television or radio broadcast at the time of transmission (or by recording the broadcast and viewing later). Accordingly, other than waiting for, and then viewing or listening to the drawing broadcast, the player has no interaction with the drawing results in playing the game.

The industry is continually seeking means to enhance the gaming experience for players and increase participation in the games. As players become more sophisticated, they demand a more fulfilling and rewarding experience from a gaming event that is in addition to the chance component of the game. The present invention provides a solution to this increasing demand by combining aspects of a unique game with an increased interactive experience for the players.

SUMMARY OF THE INVENTION

Objects and advantages of the invention will be set forth in part in the following description, or may be obvious from the description, or may be learned through practice of the invention.

The present invention provides a new lottery game system and methodology that create a more interactive experience for the player. The methods and systems are not limited to any particular type of base game, and may be implemented with any manner of known, popular, lottery game, or new games.

In a particular embodiment, a lottery gaming system includes means for a player to place a wager to participate in play of a plurality of base games. The wager entitles the player to a block of credits. A central lottery computer system is configured with the means for the player to place a wager and randomly divides the block of credits between the plurality of base games. The central computer system is also configured to conduct the plurality of base games at a later time established by the lottery authority, and to simulate actual play of the games for the player's benefit at a time that may be designated by the player. Thus, means are configured for the player to interact with the central lottery computer system to simulate play of each of the plurality of base games. A prize is awarded for a winning play of any one of the base games, with the value of the prize being a function of the number of credits that were randomly assigned to the respective base game by the central lottery computer system. Finally, means are provided for displaying to the player the results and prize awards from play of the plurality of base games.

The means for the player to place a wager may take on various forms and systems. For example, in a well-known configuration, lottery terminals are networked with the central lottery computer system at, for example, various types of retail establishments or other authorized lottery locations. The player may fill out a play slip at these locations, which is scanned or otherwise input into the system via the lottery terminal. The player is then issued a game card that entitles the player to subsequently play the plurality of base games.

In an alternative embodiment, the means for a player to place a wager may be an interactive device that is networked with the central lottery computer system whereby the player places their wager electronically, for example via an electronic play slip. The player may then be issued an electronic registration code (i.e., an electronic game card) that enables the player to access the central lottery computer system via a network enabled device for subsequent play of the plurality of base games. The interactive device may be, for example, one of a network of lottery terminals at various retail establishments wherein the player directly interfaces with the central lottery system to place their wager and conduct any manner of other transactions or processes related to the games. In still other embodiments, the interactive device may be a personal network enabled device, such as a PC, PDA, mobile cellular device, or any other of type of device that allows the player to communicate directly with the central lottery system via a network, such as the Internet, a WAN (wide area network), and the like. With any one of these personal devices, the player may be directed to download gaming software (permanent or temporary) to their device that enables the player to perform all functions needed to play the lottery game, from initial wagering to final play of the plurality of base games.

In various embodiments, the means for the player to interact with the central lottery computer system for subsequent play of the base games may be any suitable network enabled device that is in communication with the central lottery computer system. The player may be provided with a registration code (i.e., any type of authorization code or other format) for accessing the central lottery computer system via the network enabled device for play of the plurality of base games at a time selected by the player, or designated by the lottery authority.

The block of credits that are associated with the wager fee may be randomly divided so that each of the plurality of games is assigned at least one credit. For example, each wager fee may be for play of four base games with a block of twenty credits. The twenty credits are randomly distributed amongst the four base games, with at least each of the base games being assigned at least one credit. In an alternative embodiment, the block of credits is randomly divided so that each of the plurality of base games may be assigned from zero to all of the credits in the block of credits. For example, in the embodiment of four base games and twenty credits, one game may be assigned zero credits, one game assigned eight credits, one game assigned ten credits, and one game assigned two credits. It is also possible that a single game will be assigned all twenty credits.

The number of credits randomly assigned to each of the base games determines the prize awarded for a winning play of the respective base game. For example, the prize award may be the number of randomly assigned credits multiplied by a fixed monetary variable "$X." Thus, for multiple players of the same set of base games, the prizes awarded to the players for winning plays of any of the base games will vary as a function of the random number of credits assigned to the respective base game for each of the players. The central lottery system computer may be configured to display the number of different players playing the same set of base games, and the different prize awards between the players, which may add excitement and additional entertainment value to overall play of the game.

The means for the player to interact with the central lottery computer system may provide the player with interactive participation in a simulation of the actual play of the base games, which were previously conducted by the central lottery computer system. This simulation may provide the player with control of certain features of the base games, such as start time, pace of the game, game events, and so forth, without the player having any actual control or effect on the outcome of the games. For example, the actual games may be conducted by the central lottery system computer any time prior to the player's participation, with the results of the game thus being predetermined by the time the player simulates play of the games. The player may be provided with a window of time in which they can interact with the central lottery system computer for simulated play of the games, or just to learn of the actual outcome of the games without taking part in the simulation. The player may be permitted to play anytime within this window. The player may play the games all at once, or intermittently over the allowed time frame. The player may be permitted to replay the games as many times as they like.

The type of base games may be wide and varied. For example, all of the base games may have the same theme, such as Keno or Bingo. In alternate embodiments, each of the base games has a separate and distinct theme. For example, one game may be a Keno game, another a Bingo game, a third a Poker game, and so forth.

The present systems and methods are particularly suited for Keno lottery games and, in one embodiment, the plurality of base games are Keno games with the player designating a common spot for all of the Keno games. For example, the player may have the option of selecting from a one-spot to a ten-spot for the group of base games. In an alternate Keno embodiment, the player may designate a different specific spot for each of the Keno games.

The player may be able to designate the number of games in the plurality of base games from a range of games. For example, the player may be provided the option to designate any combination of at least two base games from a group of six base games, with the block of credits being randomly divided between the number of games designated by the player. In an alternate embodiment, the number of the base games is established by the lottery authority and does not vary.

In still another further unique embodiment, the central lottery computer system is further configured to generate a random multiplier factor for each of the base games from a range of multiplier factors. The multiplier factor may be an option that requires an additional fee from the player. For example, the game may include four base games with the option to purchase a randomly generated multiplier factor for each game. The multiplier factor may be from one (no multiplication) to a predefined maximum factor (i.e., five multiplication factor).

The present invention also encompasses various embodiments of a lottery game methodology. In one particular embodiment, the method includes receiving a wager from a player to participate in play of a plurality of base games, the wager entitling the player to a block of credits. With a central lottery computer system, the respective block of credits is randomly divided between the plurality of base games for each player such that different players may have a different number of credits assigned to the same base game. Play of the plurality of base games is conducted by the central lottery computer system such that the outcome of the each of the base games is predetermined. Each of the players interacts with the central lottery computer system subsequent to actual play of the plurality of base games by the central lottery computer system to simulate play of each of the base games and to determine the actual results of the base games conducted by the central lottery computer system. The prize awarded for a winning play of any one of the base games is a function of the number of credits that were randomly assigned to the respective base game by the central lottery computer system such that different players may be awarded different prize amounts for the same base game.

The methods may involve the players interacting with the central lottery computer system via a network enabled device in communication with the central lottery computer to place their initial wager and for subsequent simulated play of the plurality of base games.

In conducting the simulated play of the base games, the player may control any combination of initiation, timing, and control of the plurality of base games at a time selected by the player, with the outcome of the base games being predetermined prior to the player's interactive participation.

Various embodiments of the method may require the player to designate the number of games in the plurality of base games from a range of games, with the block of credits being randomly divided between the number of games designated by the player.

In other embodiments, the method may include generating a random multiplier factor for each of the base games from a range of multiplier factors.

BRIEF DESCRIPTION OF THE DRAWINGS

A full and enabling disclosure of the present subject matter, including the best mode thereof, directed to one of ordinary skill in the art, is set forth in the specification, which makes reference to various embodiments in the appended figures, in which.

DETAILED DESCRIPTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Figure 1:
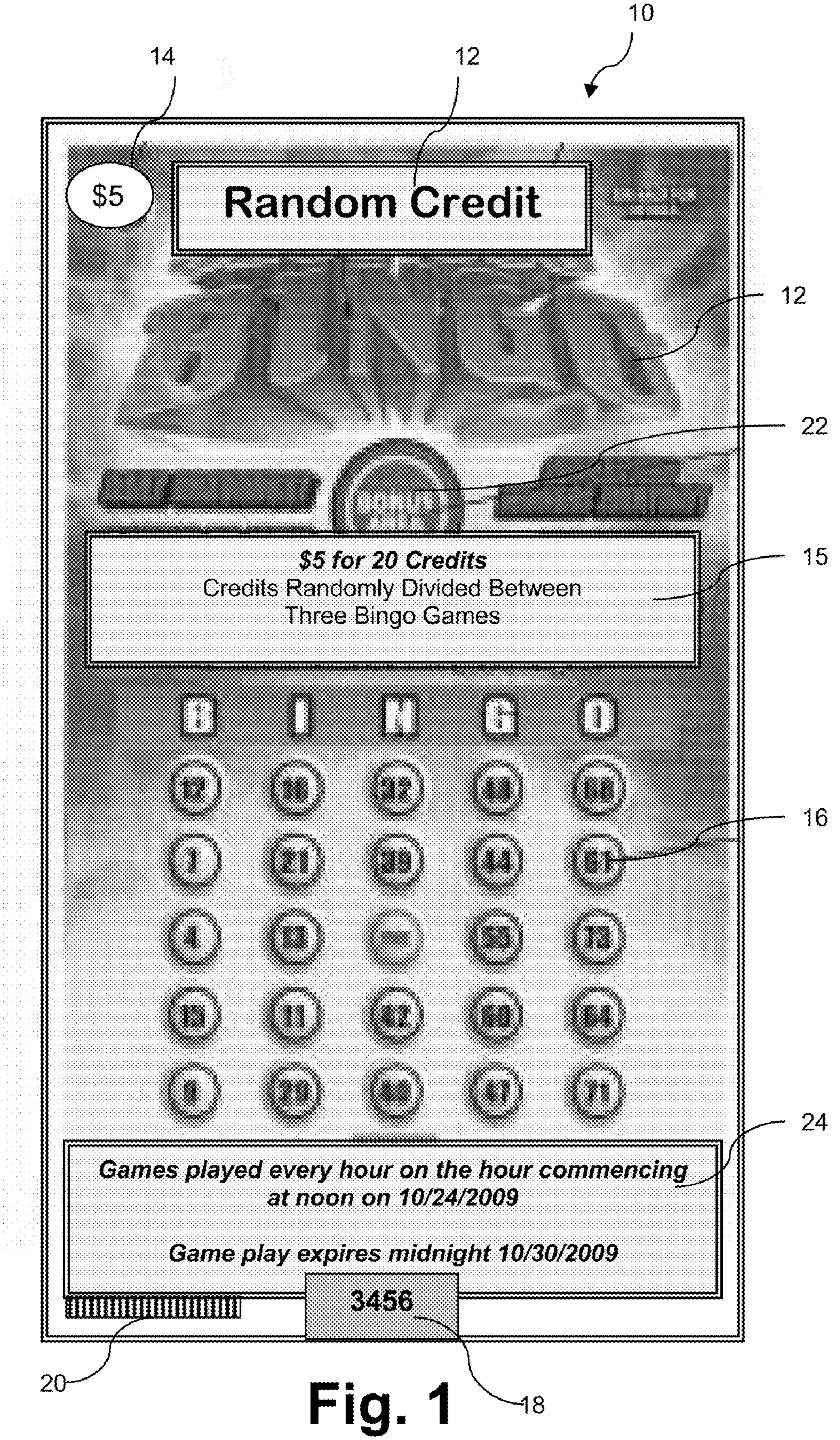
FIG. 1 is an illustration of an exemplary game card incorporating aspects of the present invention.
Figure 2:
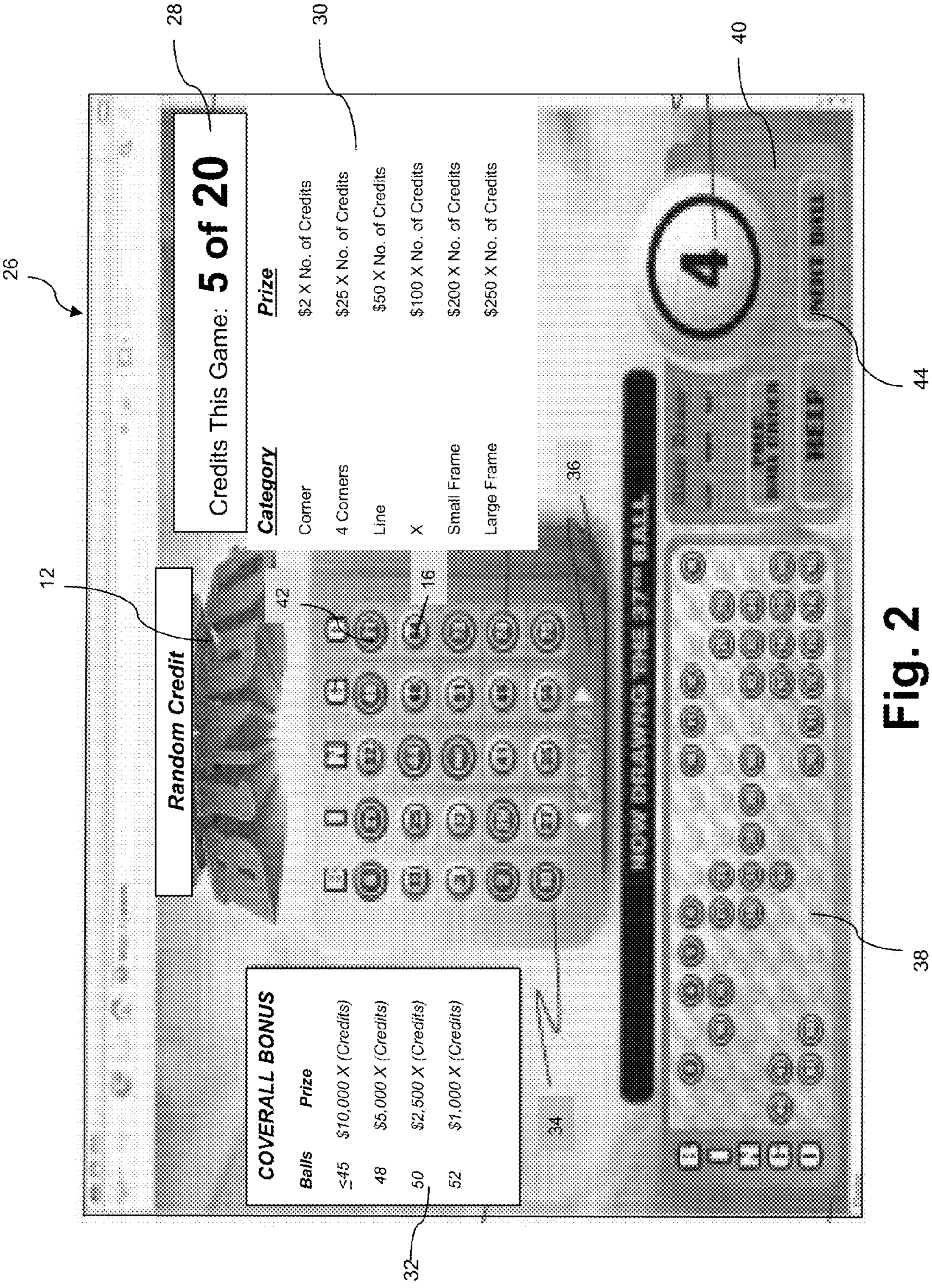
FIG. 2 is an illustration of an exemplary embodiment of an interactive video screen shot related to the game depicted in FIG. 1.

FIGS. 1 and 2 are illustrations related to a game incorporating aspects of the present invention. In FIG. 1, a game card 10 is illustrated that includes any manner of game indicia 12, which advertises and explains the game. For example, the indicia 12 depicts a random credit Bingo game wherein a wager amount of $5 (indicated by wager indicia 14) entitles the player to 20 credits. These credits are randomly divided between three Bingo games, as depicted by the credit indicia 15. The game card 10 includes a simulated Bingo card having game play indicia 16 depicted thereon. The game card 10 may further include indicia 24 that instructs the player as to when the games will be commenced. Additional instructions may be provided to the player, for example on the back side of the game card 10, informing the player of the process for subsequent play of the games. The game card 10 may include a registration code 18 that is unique to the particular game card, and provides authorization for the player to play the subsequent games at the time indicated. The registration code 18 may be used to access the lottery gaming system for play of the games, as discussed above. The game card 10 may further include any manner of additional card identification indicia 20, such as a bar code, serial number, or any other type of identification. This identification information may be used by the lottery gaming system for any purpose, including inventory, security, and so forth.

As discussed above, the game card 10 depicted in FIG. 1 may be provided to the player by various methods. For example, the game card 10 may be provided to the player at a remote lottery terminal in response to a game slip that was filled out and presented by the player at the lottery terminal. In an alternate embodiment, the player may place their wager via an interactive electronic play slip via a lottery terminal, or other network-enabled device, and receive an electronic version of the game card 10 illustrated in FIG. 1, or equivalent. This electronic game card 10 may be stored in a library that is accessible by the player. In addition, the player may receive a hard copy of the game card 10.

As discussed above, at a time identified by the gaming authority subsequent to the player's wager, simulated play of the plurality of base games are conducted, with the actual outcome of the games being determined by the lottery authority prior to the simulated play. The player interacts with the central lottery computer system for the subsequent play of these games. For example, the player may use the registration code 18 depicted in FIG. 1, or any other type of authorization code, for accessing the central lottery computer via a network-enabled device for play of the plurality of base games at a time selected by the player within the time frame allocated by the lottery authority and identified on the game card 10, for example by means of the indicia 24 depicted in FIG. 1. It should be appreciated that the player may interact with the central lottery computer via any suitable network-enabled device, such as a PC, PDA, mobile cellular device, or any other type of device that allows the player to communicate directly with the central lottery system via a network, such as the internet, a WAN (wide area network), and the like. For play of the games, the player may be directed to download gaming software to their PC or other network-enabled device that enables the player to perform all functions needed to play the plurality of lottery games.

FIG. 2 is a depiction of a video screen shot 26 that may be displayed on the player's interactive network-enabled device for play of the base games authorized by the game card 10 in FIG. 1. Referring to FIG. 2, once a player has accessed the central lottery computer system, for example with the authorization code 18 via an internet website, the player may be presented with the screen 26. This screen also includes any manner of game indicia 12 that advertises and explains the nature of the base games. A depiction 34 of a game card for each of the plurality of base games may also be provided. For example, in this embodiment, the depiction 34 is of a unique Bingo card used to play each of the three separate base Bingo games. Game play indicia 16 for each individual Bingo card is depicted, and is compared to drawn Bingo numbers, which may be reflected in the drawn game indicia frame 38. Matching numbers between the game card and the drawn numbers may be indicated on the Bingo card 34, as depicted by the matched drawn numbers 42 on the card. A toggle function 36 may be provided so that the player may move to another one of the plurality of base games at any time they desire. A current game indicia draw frame 40 may also be provided, which reflects the most recent or current drawn game indicia. Simulated actuators 44 may be provided to enable the player to control when the balls are actually drawn and displayed.

A bonus frame 32 may be provided in the screen shot 36 that explains or indicates the results of any bonus function in the game. For example, in the particular game illustrated in the depiction of FIG. 2, a bonus is awarded based on the number of balls drawn prior to the entire Bingo card being covered or completed with drawn game indicia. The prize award for the bonus may also be a function of the number of credits. For example, in the event that the Bingo card is completely covered or matched by fifty-two drawn game indicia, then a bonus is awarded that equals $1,000 multiplied by the number of credits randomly generated for the particular game. In the illustrated embodiment, the random number of credits generated for the game is 5 of 20 credits, as indicated in the credit frame window 28.

A prize table frame 30 may also be provided to explain the prize structure in the plurality of base games. The prize structure is a function of the number of credits randomly generated for the particular game. For example, referring to FIG. 2, a straight matched line on the Bingo card 34 wins a prize of $50 times the number of randomly generated credits, which is 5 credits for this particular game.

As explained above, the block of credits associated with the player's initial wager is randomly divided so that each of the plurality of base games is assigned at least one credit. In the embodiment illustrated in FIGS. 1 and 2, 20 credits are randomly divided between three base Bingo games. Depending on the rules of the game, the player may be assured that every base game is assigned at least one credit. In an alternative embodiment, the block of credits may be randomly divided so that any one of the base games may be assigned from zero to all of the credits. For example, it may be possible that, although there are three base games, one game is randomly assigned all of the 20 credits, and the other two base games receive zero credits.

It should thus readily be appreciated that, because the prize award for any one of the plurality of base games is a function of the randomly assigned credits, multiple players of the same set of base games may be awarded different prizes. The central lottery system computer may be configured to display on the screen shot 26 the number of different players playing the same set of base games, and the different prize awards between the players. This may add an additional degree of excitement value to overall play of the game.

As described above, any combination of simulated actuators 44 may provide the player with a degree of control over a certain aspect of the base games. It should be readily appreciated that any number or configuration of simulated actuators or other control functions may be provided via the player interactive device to give the player a sense of control of certain features of the base games, such as start time, pace of the game, display of game events, and so forth. For example, play of the plurality of base games may be allocated to a certain block of time, as specified in the game card 10 of FIG. 1 wherein the player is instructed that the plurality of base games are conducted every hour on the hour commencing at noon on a certain day, and with play expiring at midnight on a different day. At any time within this time frame, the player may access the central lottery system computer, as discussed above, for simulated play of the plurality of base games. The player may stop and start play of any one of the games any time within this time frame. During conduct of any one of the games, the player may control when the individual game indicia are drawn, how the indicia is displayed, and so forth.

As described above, the type of base games that may be implemented with the gaming system and methodology of the present invention may be wide and varied. All of the plurality of base games may have the same theme, such as a Bingo theme as in the games illustrated in FIGS. 1 and 2. In an alternative embodiment (not illustrated in the figures), each one of the plurality of base games may be a different themed game. For example, one game may be a Bingo game, a second game may be a Keno game, and a third game may be a Poker game.

For play of the plurality of base games via a remote network-enabled device, such as the player's personal PC or PDA, the player may be instructed to download and execute game client software from a lottery provider's website, or some other website, for use with the game. With this software, the player then enters the registration code previously provided to the player at the time of their wager, which is subsequently transmitted to a game server connected to the online lottery system. The Lottery system retrieves a record of the player's respective game card that was stored when the player purchased the card, and commences the processes for simulated play of the base games on the player's internet-enabled device. Any manner of information may be transmitted to the device for this purpose. The game server assembles and formats the outcome of the drawings or play of the base games for presentation and simulated play via the player's network enabled device. As described above, the actual outcome of the games is concluded prior to the player's simulated play, and the player does not actually control any aspect of the base games that would affect the outcome of the games. The game software may be formatted to display the results of the base games as if the games were being conducted concurrently in real time as the player views the screens. It is also possible that the actual base game drawings are conducted in real time while the player is viewing the screens. However, the degree of player simulated interaction with the game may be limited in this configuration. By conducting the games and storing the outcome of the games for subsequent presentation to the player, the player is able to select the time they wish to simulate play of the game. As such, although the lottery drawing may have actually occurred hours earlier, the results of the plurality of base games are revealed to the player in a manner that simulates a "live" drawing as the player views the draw results and other information that can be updated as it is reported to the player. In addition, the software may be configured to allow players to replay past drawings in the same way in order to 'relive" the drawings, particularly if one of the drawings was a winning event.

Figure 3A:
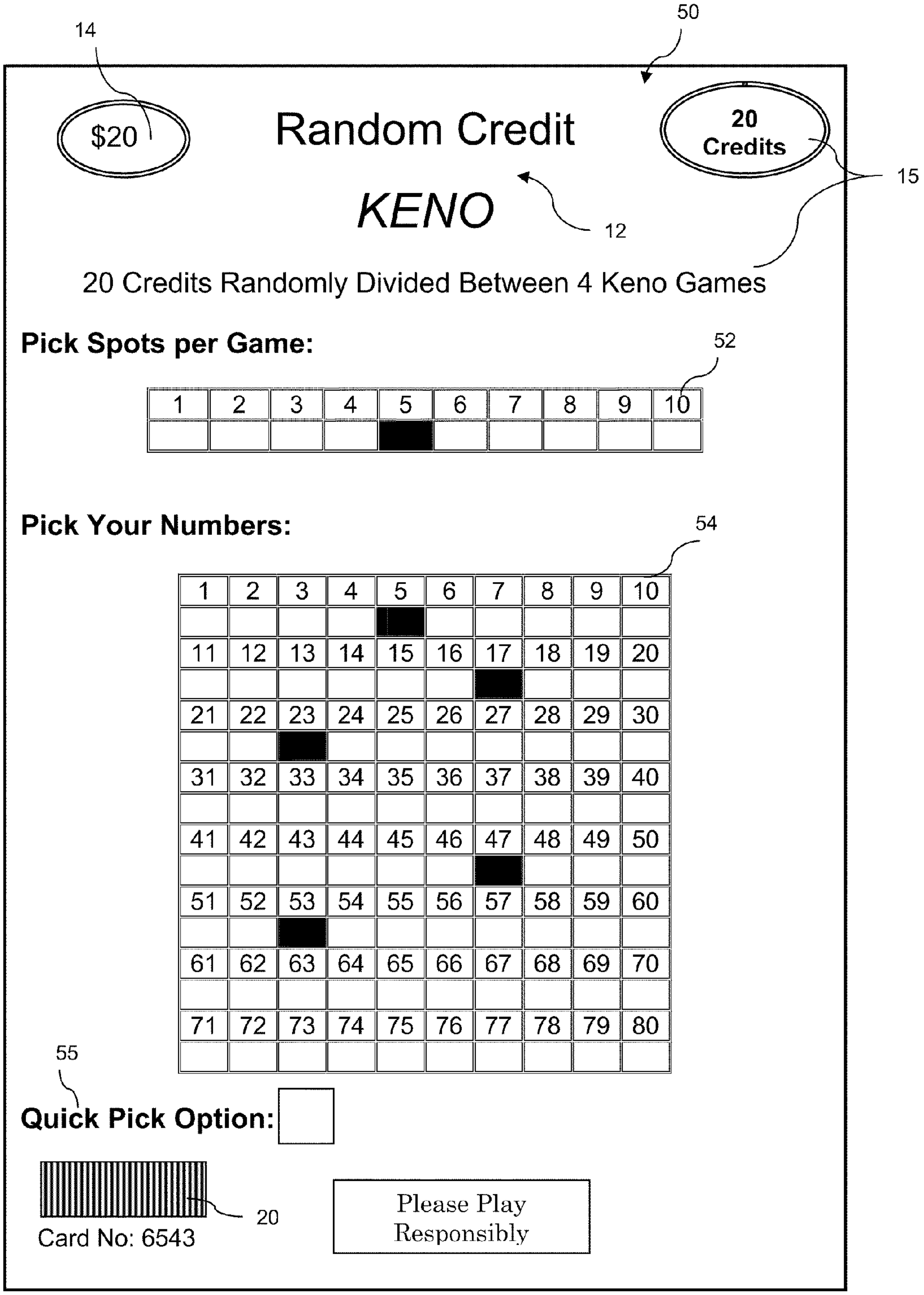
FIG. 3A is an illustration of a play slip for an alternative Keno game incorporating aspects of the present invention.
Figure 3B:
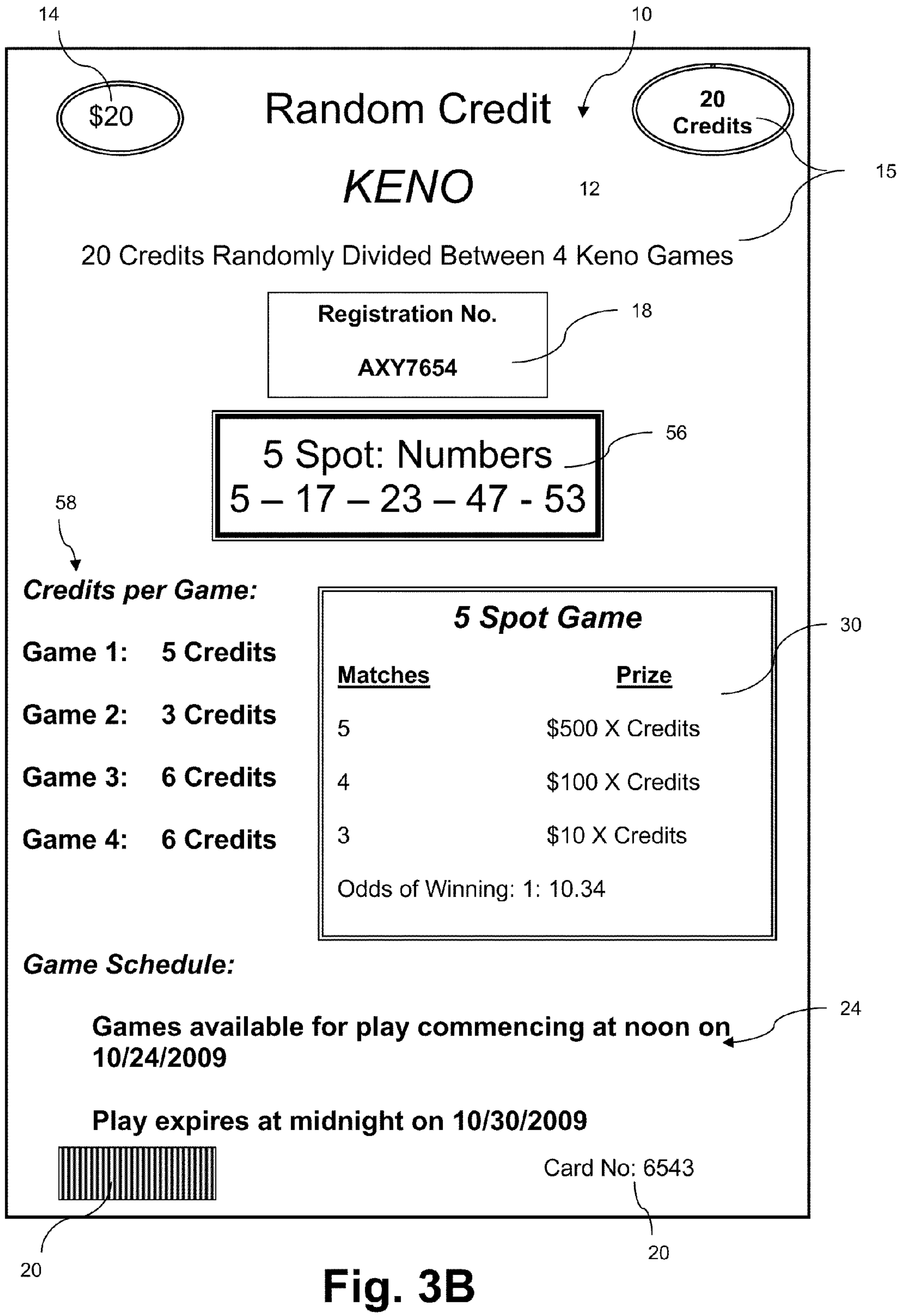
FIG. 3B is an illustration of a game card related to the Keno game of FIG. 3A.

As described above, the present system and methodology are particularly suited for Keno lottery games as one or more of the plurality of base games. An embodiment of a Keno-themed base game is illustrated in FIGS. 3A and 3B. FIG. 3A depicts a play slip 50, which may be a paper slip presented at a lottery terminal, or an electronic simulated slip completed electronically by a player, whereby a player places a wager of $20 indicated by the wager indicia 14, and is entitled to 20 credits, as indicated by the credit indicia 15. As described on the play slip 50, the 20 credits are randomly divided between four Keno games. The play slip 50 may include any other manner of game indicia 12 that advertises, or describes various aspects of the Keno games. The play slip 50 includes a spot selection section 52 wherein the player designates the number of spots they wish to play in the plurality of base Keno games. In the illustrated embodiment, the player has selected five spots.

The play slip 50 includes a number selection section 54 wherein the player designates the particular five spots from the range of numbers 1 through 80. In the illustrated embodiment, the player has selected the numbers 5, 17, 23, 47, and 53. Alternatively, the play slip 50 may provide the player with a quick-pick option, as indicated by the option 55.

The play slip 50 may include any manner of card identifier 20, such as a bar code, serial number, or any other identification indicia or symbol that may be used by the lottery authority for any purpose.

FIG. 3B illustrates a game card 10 issued to the player related to the game slip 50 depicted in FIG. 3A. As discussed above, the game card may be a paper card 10 that is provided to the player, for example at a lottery terminal, or an electronic simulation of a card 10 that is stored for the player and later accessible by the player. The card 10 reflects many of the aspects of the game slip 50 in FIG. 3A, including the credit indicia 15, wager indicia 14, game indicia 12, and so forth. The player's spot selection numbers are provided in a play indicia area 56. The game card 10 provides the player with their unique registration number 18 that enables the player to subsequently interact with the central lottery game computer for play of the base games, as discussed above.

The game card 10 in FIG. 3B also includes a prize table section 30 that describes the prize structure for the various five spot games as a function of the number of randomly generated credits assigned to each game.

The game card 10 in FIG. 3 also includes a section 58 that reports the results of random distribution of the 20 credits between the four base Keno games. For example, the first Keno game was randomly assigned five credits, and so forth.

The game card 10 includes a game play time section 24 that describes to the player the time frame in which subsequent play of the base Keno games may be conducted.

As described above with respect to the game illustrated in FIGS. 3A and 3B, the player will interact with the central lottery computer within the time frame specified in order to play the base Keno games. The unique registration number 18 is the means by which the player is authorized to play the games, as discussed above.

Those skilled in the art are familiar with conventional Keno games, and a description as to how the base Keno games are actually played is not necessary for purposes of the present disclosure.

Figure 4:
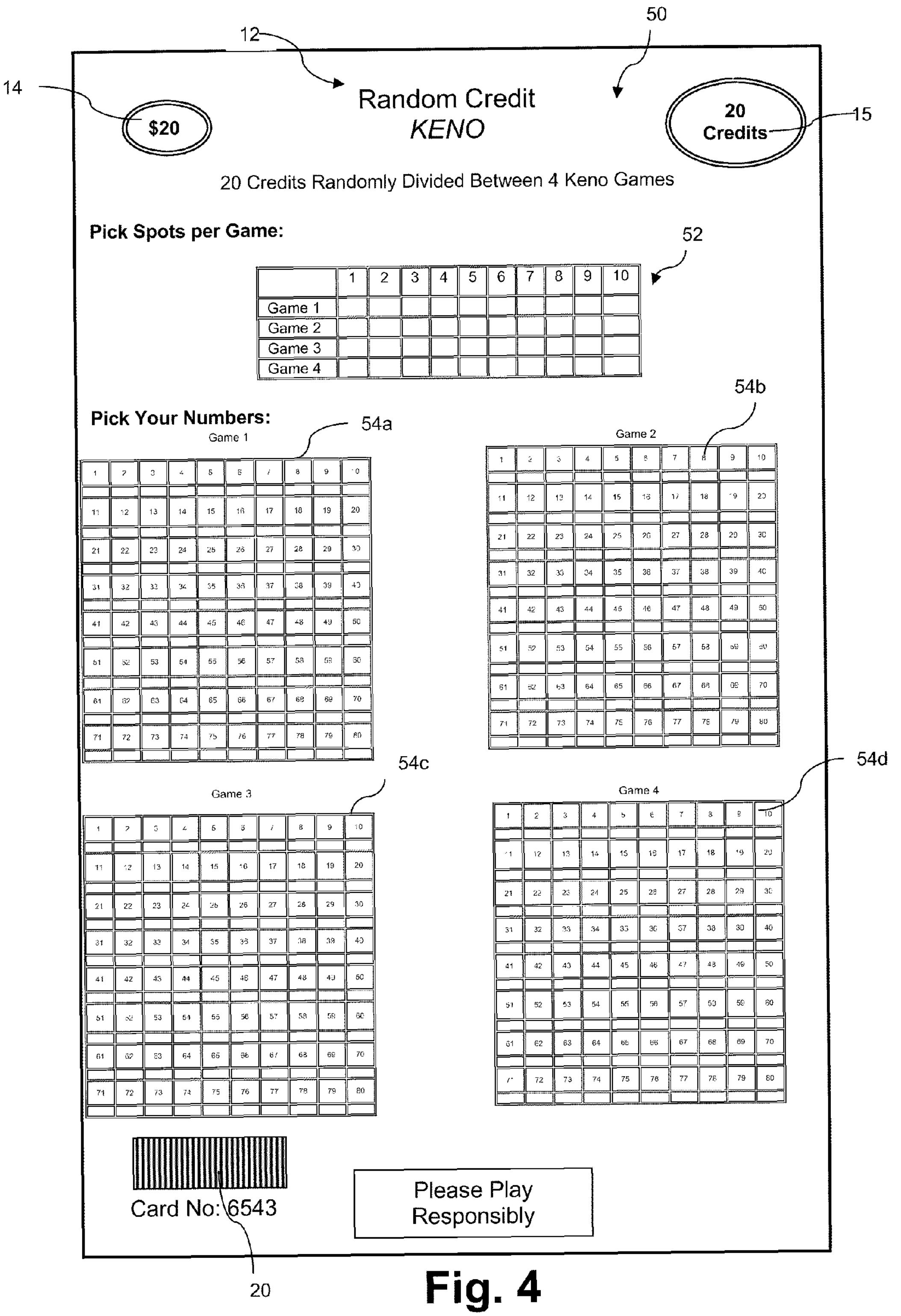
FIG. 4 is an illustration of a play slip for yet another Keno game incorporating aspects of the present invention.

FIG. 4 illustrates a game slip 54 play of a plurality of base Keno games in an alternate embodiment. With this particular game, the player is provided the option to pick a different number of spots for each of the four Keno games by means of the spot selection table 52. For example, the player may designate between one and ten spots for each of the four Keno games. Similarly, the game slip includes a number selection area 54*a* for game 1 wherein the player designates their play numbers for game 1. A similar section is provided for each of games 2 through 4 (sections 54*b*, 54*c*, and 54*d*).

In response to the player's designations on the play slip 50, the player would be issued a game card reflecting their spot selection and number designations for each of the four Keno games. The games would then be played at a subsequent time via interactive interface with the central lottery computer, as discussed above.

Figure 5A:
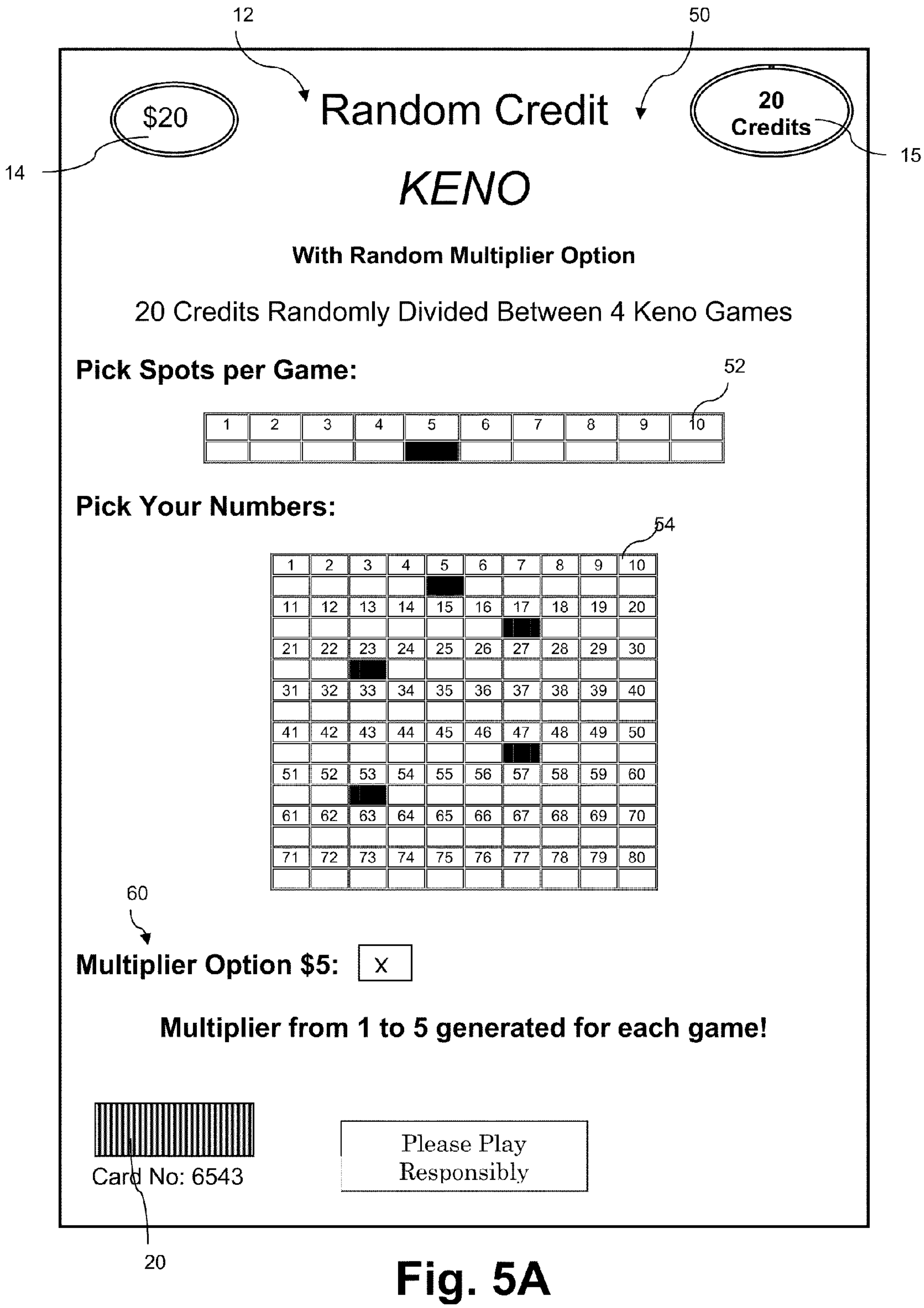
FIG. 5A is an illustration of a play slip for an alternative Keno game incorporating a multiplier factor.
Figure 5B:
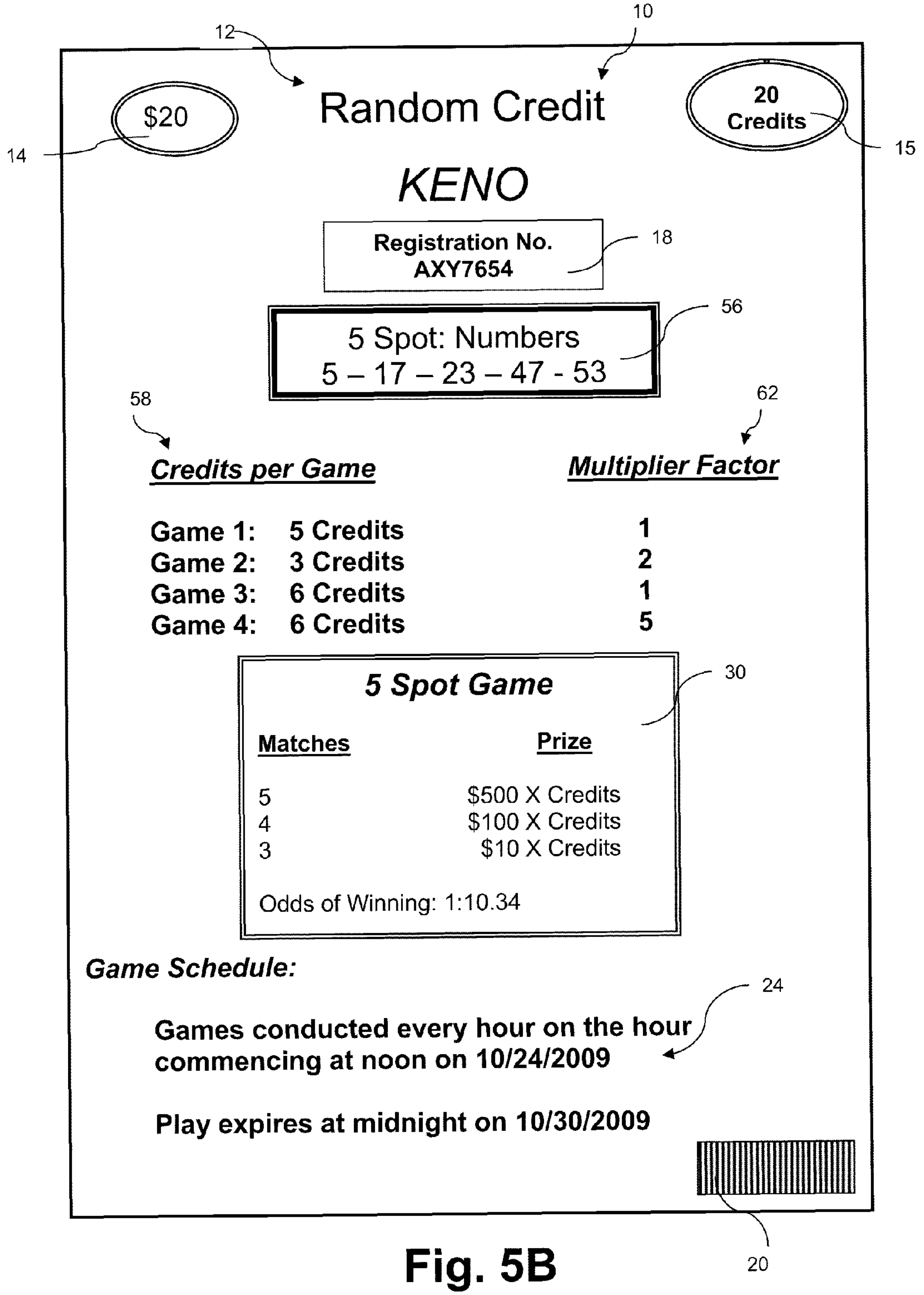
FIG. 5B is an illustration of a game card related to the Keno game of FIG. 5A.

FIGS. 5A and 5B depict another version of Keno base games, which are similar in many aspects to the games depicted by FIGS. 3A and 3B. With this particular game, a random multiplier factor is also incorporated. For example, referring to the game slip 50, a multiplier option 60 is provided to the player. For an additional fee (in this case $5), a multiplier factor within a specified range will be randomly generated for each of the base Keno games. If a prize is awarded in any of the games, then the multiplier factor may increase the prize award as a function of the randomly generated credits. The game card 10 illustrated in FIG. 5B illustrates these concepts. This game card 10 includes a credit distribution area 58 wherein the results of the random distribution of the credits between the four Keno games is reported. In addition, a multiplier factor distribution section 62 is also provided and indicates the results of random generation of a multiplier factor from between 1 to 5 generated for each game. In the illustrated embodiment, for example, each of games 1 and 3 was randomly assigned a multiplier factor of 1. In this case, the prize award is not actually increased by the multiplier factor. In game 4, the randomly generated multiplier factor is 5, and the prize awarded in game 4 (if any) is multiplied by 5.

Although not depicted in FIGS. 5A and 5B, it should be understood that the multiplier factors may also be a direct function of the random distribution of the credits. For example, the multiplier factors may be equal to or a function of the number of generated credits. For example, referring to game 1, five credits were randomly generated for game 1. The multiplier factor randomly assigned to game 1 may be 5 (equal to five credits) or a fixed factor times the number of randomly generated credits (for example 1 half of the randomly generated credits).

Subsequent play of the base Keno games depicted by the play slip and game card 10 of FIGS. 5A and 5B may be conducted at a subsequent time by the player, as discussed above.

Figure 6:
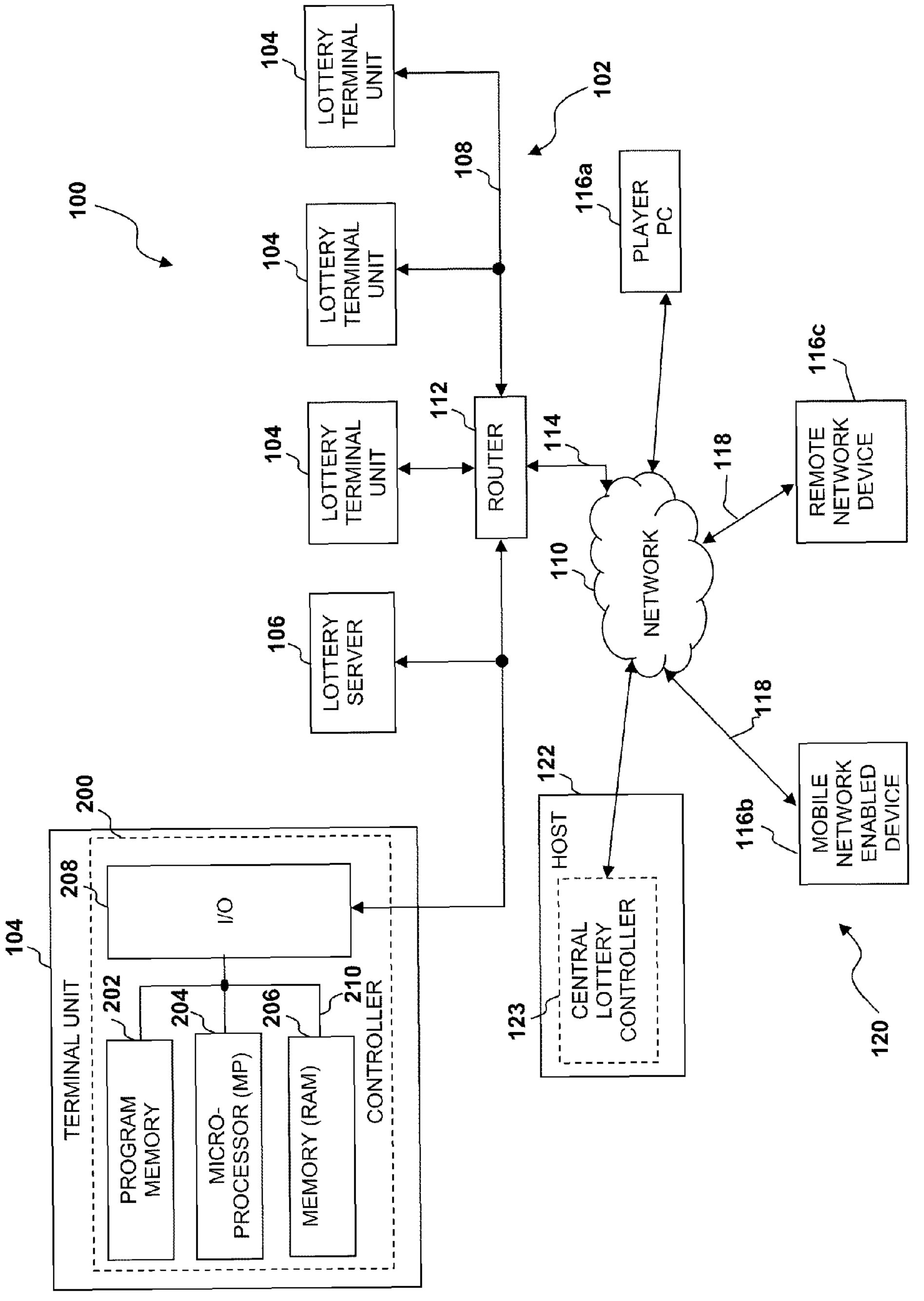
FIG. 6 is a schematic view of an exemplary gaming system in accordance with aspects of the present invention.

FIG. 6 is a diagram view of a representative lottery gaming system 100 that may be used to practice aspects of the invention. The system 100 may include a first group or network 102 of lottery terminal units 104 operatively coupled to a lottery network computer or server 106 via a network data link or bus 108. The network 102 may be coupled to a network 110, which may be, for example, the Internet, a wide area network (WAN), or a local area network (LAN) through a network hub or router 112 via a first network link 114. In one possible configuration, the first network 102 may be a state or other jurisdictional lottery system operating within an individual state or region of states. In this configuration, the individual lottery terminal units 104 may be interconnected to a central lottery system (e.g., host computer system 122) for tracking and coordination of the state lottery system, including issued tickets, game results, drawn numbers, amounts waged, and any other function of the lottery game.

The lottery terminal units 104 may be configured with any manner of hardware and software functionality to accept a player's game card, and to activate the card with the central lottery system, as discussed above. The lottery terminal units may be located at any business establishment authorized to conduct the lottery game, and particularly to sell the player game cards. The lottery terminal units 104 may also be configured for redeeming a player game card presented after the plurality of base games have been concluded. The terminal units 104 may be utilized in this regard to scan and transmit the card activation number (or other type of card identifier) to the central lottery system, which in turn will verify that the card was registered for play and the results of played games, and authorize payment of any prize award.

As discussed above, in certain embodiments, players may interface directly with the central lottery system without the necessity of a lottery terminal unit 104. For example, the player may purchase a game card from an authorized lottery agent, and subsequently enter the game by accessing the central lottery system directly via a network enabled device (for example, an Internet enabled PC or mobile device) and inputting a registration number (or other type of card identifier) into the system. In still another embodiment, the player may place their wager directly with the central lottery system via their network enabled device and need not separately purchase a game card. In this regard, the lottery network 100 may be configured for interacting with any manner of network enabled device used by players, such as the PC 116*a*, a mobile network enabled device 116*b* (such as a PDA or cellular phone), or any other type of remote network enabled device 116*c*, as depicted in FIG. 6. These other network enabled devices 116 may be directly connected to the network 110 through a plurality of direct network links 118, thereby eliminating the need for the bus, router, or other networking equipment. It should also be appreciated that each of the network enabled devices 116 in this configuration may represent a lottery node 120. The lottery nodes 120, in turn, may be directly connected and/or multiplexed to the network 110 via the direct network links 118. Further, the direct network links 118 may represent secure communications channels physically hardened against tampering and/or the communications may be encrypted to prevent unauthorized access to information transmitted thereon.

In one embodiment, the central lottery system is administered by the lottery game provider and includes a host computer 122, which generally includes a central lottery controller 123 for controlling aspects of the lottery or gaming system. It should be readily appreciated that the central lottery controller may include an integrated server, or the host computer 122 may include any manner of periphery server or other hardware structure. The host computer 122 is configured to carry out the gaming functions associated with the unique random credit lottery games described herein.

The central lottery system host computer 122 may be a single networked computer, or a series of interconnected computers having access to the network 110 via a gateway or other known networking system. Generally, the central host computer 122 may include a central controller 123 configured to manage, execute and control the individual terminal units 104, and to interface with the network enabled devices 116 for play of the lottery games, as described herein. The central controller 123 may include a memory for storing gaming procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 100.

The central controller 123 may be directly or indirectly connected through the I/O bus to any manner of peripheral devices such as storage devices, wireless adaptors, printers, and the like. In addition, a database (DB) may be communicatively connected to the central controller 123 and provide a data repository for the storage and correlation of information gathered from the individual terminal units 104, devices 116 or nodes 120. The information stored within the database may be information relating to individual terminal units 104, such as terminal specific information like a terminal identification code, voting authority code, and location for each ballot received. The database may further include player or game card specific information.

FIG. 6 further provides a block diagram of selected portions of one possible embodiment of a lottery terminal unit 104. Although the following description relates to the design of the lottery terminal unit 104 depicted in FIG. 6, it should be understood that the lottery terminal units 104 (or network enabled devices 116) may include similar features or may be configured with functionality to allow the entry of the information required for participation in lottery games. The exemplary lottery terminal unit 104 may include a number of internal components such as a controller 200 having a program memory 202, a microcontroller or microprocessor (MP) 204, a random access memory (RAM) 206, and an input/output (I/O) bus 208, all of which may be interconnected via an address or data bus 210. It should be understood that while only one microprocessor 204 is shown herein, the controller 200 may be designed to support multiple microprocessors 204 arranged to operate in parallel or in any other known configuration. Similarly, the controller 200 may include multiple, and even redundant, program memories 202 and random access memories 206 to increase expandability, capacity and/or processing speed.

The program memory 202 and random access memory 206 may be implemented as a solid-state memory, an integrated circuit, a magnetically readable memory, and/or optically readable memories. Further, the program memory 202 may be read only memory (ROM) or may be read/write memory such as a hard disk. In the event that a hard disk is used as the program memory, the data bus 210 may comprise multiple address/data buses, which may be of differing types, and there may be a separate I/O circuit between the data buses.

Both memory units 202, 206 can generally be considered as data stores, which may be selectively employed to implement gaming functionality in accordance with aspects of the present gaming system. For example, program memory 202 may be used to store software in the form of computer-readable instructions and executable instructions that are configured to program the controller 200 as a special purpose computing device to perform various algorithmic steps. Memory 206 or other data store may be configured to temporarily or permanently store input and other electronic data received from a user.

It will be understood that the lottery gaming system 100 illustrated in FIG. 6 may alternatively represent a network layout within a given establishment. In this alternate configuration, each stand-alone lottery terminal unit 104 may be an interactive terminal capable of playing a variety of the base lottery or casino games, such as Keno, Bingo, video poker, video blackjack, slots, and the like. Terminal units 104 may be distributed throughout a single establishment and connected with a LAN, or throughout multiple sites and connected with a WAN. Further, the LAN and/or WAN connecting each of the terminal units 104 may include one or more separate and secure buses 108, routers 112, web servers, gateways and other networking equipment to provide continuous and/or redundant connectivity to the network 110. As discussed above, the network 110 may be communicatively connected to central host computers 122 and/or respective central lottery controllers as well as associated databases to allow for implementation, storage, tracking and analysis of gaming and lottery features required to implement the gaming system and methodology described herein.

It should be appreciated by those skilled in the art that various modifications and variations may be made present invention without departing from the scope and spirit of the invention. It is intended that the present invention include such modifications and variations as come within the scope of the appended claims.

What is claimed is:

1. A lottery gaming system, comprising:

means for a player to place a wager to participate in play of a plurality of base games, the wager entitling the player to a block of credits;

a central lottery computer system, said means for a player to place a wager configured in communication with said central lottery computer system, said central lottery computer system configured to: randomly divide the block of credits between each of the plurality of base games and conduct the plurality of base games to determine results for each of the plurality of base games;

means for the player to interact with said central lottery computer system subsequent to the central lottery computer system conducting the plurality of base games for simulated play of each of the plurality of base games, wherein a prize awarded for a winning play of any one of the base games is a function of the number of credits that were randomly assigned to the respective base game by said central lottery computer system; and means for displaying to the player results and prize awards from the simulated play of the plurality of base games.

2. The lottery gaming system as in claim 1, wherein said means for a player to place a wager comprises a lottery terminal networked with said central lottery computer system whereby the player's wager is recorded and the player is issued a game card for subsequent play of the plurality of base games.

3. The lottery gaming system as in claim 2, wherein said means for the player to interact with said central lottery computer system comprises a network enabled device in communication with the central lottery computer, said game card comprising a registration code that enables the player to access said central lottery computer system via said network enabled device for play of the plurality of base games.

4. The lottery gaming system as in claim 1, wherein said means for a player to place a wager comprises an interactive device networked with said central lottery computer system whereby the player places their wager via an electronic play slip and is issued an electronic registration code that enables the player to access said central lottery computer system via a network enabled device for subsequent play of the plurality of base games.

5. The lottery gaming system as in claim 1, wherein said means for the player to interact with said central lottery computer system comprises a network enabled device in communication with said central lottery computer system, whereby the player is provided with a registration code for accessing the central lottery computer system via said network enabled device for play of the plurality of base games.

6. The lottery gaming system as in claim 1, wherein the block of credits is randomly divided so that each of the plurality of games is assigned at least one credit.

7. The lottery gaming system as in claim 1, wherein the block of credits is randomly divided so that each of the plurality of games may be assigned from zero to all of the credits in the block of credits.

8. The lottery gaming system as in claim 1, wherein said means for the player to interact with said central lottery computer system comprises a network enabled device in communication with said central lottery computer system for the player to interactively participate in the simulated play of the plurality of base games, in which a simulation of the actual play of the base games previously conducted by said central lottery computer system is presented.

9. The lottery gaming system as in claim 8, wherein the player simulates initiation, timing, and control of the plurality of base games at a time selected by the player, with the outcome of the base games being predetermined prior to the player's interactive participation.

10. The lottery gaming system as in claim 1, wherein the plurality of base games are the same themed game.

11. The lottery gaming system as in claim 1, wherein the plurality of base games are different themed games.

12. The lottery gaming system as in claim 1, wherein the plurality of base games are Keno games, with the player designating a common spot for all of the Keno games.

13. The lottery gaming system as in claim 1, wherein the plurality of base games are Keno games, with the player designating a specific spot for each of the Keno games.

14. The lottery gaming system as in claim 1, wherein the player designates the number of games in the plurality of base games from a range of games, and the block of credits is randomly divided between the number of games in the plurality of base games designated by the player.

15. The lottery gaming system as in claim 1, wherein said central lottery computer system is further configured to generate a random multiplier factor for each of the base games from a range of multiplier factors.

16. A method for conducting a lottery game, comprising:

receiving a wager from each of a plurality of players to participate in play of a plurality of base games, the wager entitling each of the players to a block of credits;

with a central lottery computer system, for each individual player randomly dividing the block of credits between the plurality of base games such that different players may have a different number of credits of their respective block of credits assigned to the same base game;

conducting actual play of the plurality of base games with the central lottery computer system such that the outcome of the each of the base games is determined;

each of the players interacting with the central lottery computer system subsequent to actual play of the plurality of base games by the central lottery computer system to simulate play of each of the base games and to determine the actual results of the base games conducted by the central lottery computer system; and wherein for each player the prize awarded for a winning play of any one of the base games is a function of the number of credits that were randomly assigned to the respective base game by the central lottery computer system for the player, such that different players may be awarded different prize amounts for the same base game.

17. The method as in claim 16, wherein the players interact with the central lottery computer system via a network enabled device in communication with the central lottery computer to place their wager and for subsequent simulated play of the plurality of base games.

18. The method as in claim 16, wherein the block of credits is randomly divided so that each of the plurality of base games is assigned at least one credit.

19. The method as in claim 16, wherein the block of credits is randomly divided so that each of the plurality of base games may be assigned from zero to all of the credits in the block of credits.

20. The method as in claim 16, wherein each player of the plurality of players simulates any combination of initiation, timing, and control of the plurality of base games at a time selected by the player, with the outcome of the base games being determined prior to the player's interactive participation.

21. The method as in claim 16, further comprising generating a random multiplier factor for each of the base games from a range of multiplier factors.

* * * * *